(12) United States Patent
Park et al.

(10) Patent No.: US 8,976,393 B2
(45) Date of Patent: Mar. 10, 2015

(54) IMAGE FORMING APPARATUS SUPPORTING NEAR FIELD COMMUNICATION FUNCTION AND METHOD OF DISPLAYING MENU IN IMAGE FORMING APPARATUS

(71) Applicant: Samsung Electronics Co., Ltd., Suwon-si, Gyeonggi-do (KR)

(72) Inventors: Jea-hong Park, Suwon-si (KR); Dae-hyun Kim, Yongin-si (KR); Sung-joon Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/862,653

(22) Filed: Apr. 15, 2013

(65) Prior Publication Data

US 2014/0126011 A1     May 8, 2014

(30) Foreign Application Priority Data

Nov. 6, 2012   (KR) ........................ 10-2012-0125091

(51) Int. Cl.
*G06F 3/12*   (2006.01)
*G06K 15/00*   (2006.01)
*H04N 1/00*   (2006.01)

(52) U.S. Cl.
CPC ....... *H04N 1/00106* (2013.01); *H04N 1/00307* (2013.01); *H04N 1/00413* (2013.01); *H04N 1/00474* (2013.01); *H04N 2201/006* (2013.01); *H04N 2201/0094* (2013.01); *H04N 2201/0082* (2013.01)
USPC ......... 358/1.15; 358/1.16; 358/1.13; 715/273

(58) Field of Classification Search
None
See application file for complete search history.

(56) References Cited

U.S. PATENT DOCUMENTS

| | | | |
|---|---|---|---|
| 6,437,875 B1 * | 8/2002 | Unno | 358/1.16 |
| 7,464,333 B2 * | 12/2008 | Yamamoto | 715/273 |
| 7,992,083 B2 * | 8/2011 | Yamamoto | 715/273 |
| 8,189,225 B1 | 5/2012 | Lo et al. | |
| 8,340,577 B2 * | 12/2012 | Griffin et al. | 455/41.2 |
| 8,463,186 B2 * | 6/2013 | Griffin et al. | 455/41.2 |
| 8,656,277 B2 * | 2/2014 | Yamamoto | 715/273 |
| 2008/0152376 A1 * | 6/2008 | Ananthesh | 399/81 |
| 2009/0201539 A1 * | 8/2009 | Sawayanagi et al. | 358/1.15 |
| 2011/0022203 A1 | 1/2011 | Woo et al. | |
| 2011/0070825 A1 * | 3/2011 | Griffin et al. | 455/41.1 |
| 2011/0070826 A1 * | 3/2011 | Griffin et al. | 455/41.1 |
| 2011/0070827 A1 * | 3/2011 | Griffin et al. | 455/41.1 |
| 2011/0070828 A1 * | 3/2011 | Griffin et al. | 455/41.1 |

(Continued)

FOREIGN PATENT DOCUMENTS

| | | |
|---|---|---|
| KR | 10-2007-0058907 | 6/2007 |
| KR | 10-2008-0054664 | 6/2008 |
| KR | 10-2011-0019042 | 2/2011 |

OTHER PUBLICATIONS

International Search Report issued in PCT/KR2013/004198 on Jul. 26, 2013.

*Primary Examiner* — Satwant Singh
(74) *Attorney, Agent, or Firm* — Staas & Halsey LLP

(57) ABSTRACT

An image forming apparatus to support a near field communication (NFC) function receives address book information stored in a user terminal by tagging the user terminal, and generates a quick menu in which image forming functions related to the received address book information are listed and displays the quick menu on a user interface unit.

20 Claims, 21 Drawing Sheets

(56) References Cited

U.S. PATENT DOCUMENTS

| | | | |
|---|---|---|---|
| 2011/0070829 A1* | 3/2011 | Griffin et al. | 455/41.1 |
| 2011/0070834 A1* | 3/2011 | Griffin et al. | 455/41.1 |
| 2011/0185183 A1* | 7/2011 | Yamamoto | 713/182 |
| 2013/0023258 A1* | 1/2013 | Choi et al. | 455/418 |
| 2013/0057908 A1* | 3/2013 | Park | 358/1.15 |
| 2013/0242805 A1* | 9/2013 | Jung | 370/255 |
| 2013/0273850 A1* | 10/2013 | Kim et al. | 455/41.2 |
| 2014/0079426 A1* | 3/2014 | Robinson et al. | 399/82 |

* cited by examiner

\<NFC enabled phone\>

\<NFC enabled phone\>

NFC tag

| Item | Value |
|---|---|
| Device Name | CLX-4170FW |
| Serial Number | 1234567890 |
| Print Capacity | Color, Mono |
| Scan Capacity | 300. 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

FIG. 8

| Menu | Information |
|---|---|
| Phone Address | +82-10-3168-9901, +1-801-358-5961, ... |
| Fax Address | +1-213-123-4567, +82-2-234-4435, ... |
| Email Address | test1@samsung.com, test2@samsung.com, test2@google.com, ... |
| Server Address | (10.123.123.12, FTPFOLDER), (10.34.53.124, SMBFOLDER), ... |
| URL Address | ... |
| WORKFORM | Workformsample1.XML, ... |

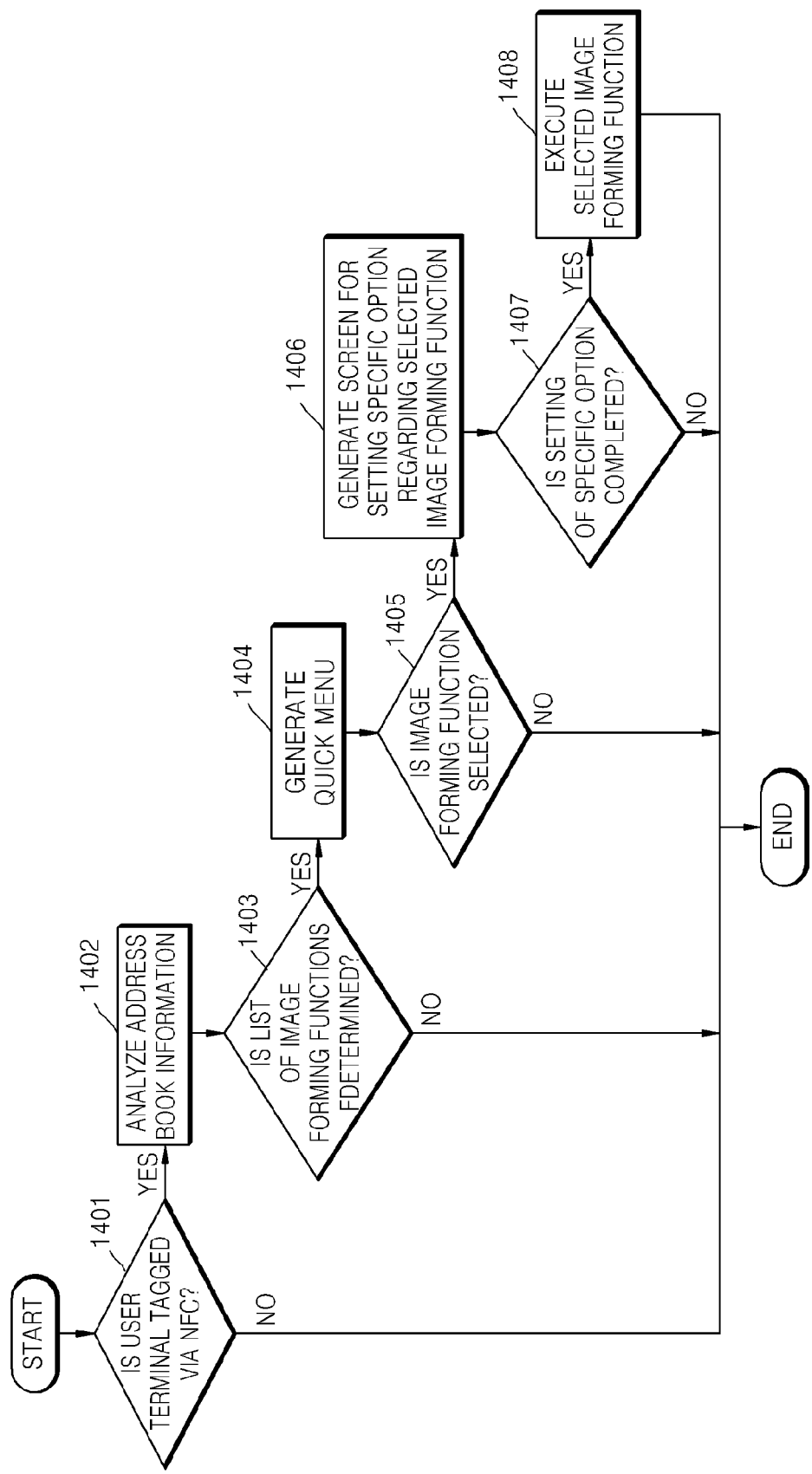

IMAGE FORMING APPARATUS SUPPORTING NEAR FIELD COMMUNICATION FUNCTION AND METHOD OF DISPLAYING MENU IN IMAGE FORMING APPARATUS

CROSS-REFERENCE TO RELATED APPLICATIONS

This application claims the benefit of Korean Patent Application No. 10-2012-0125091, filed on Nov. 6, 2012, in the Korean Intellectual Property Office, the disclosure of which is incorporated herein in its entirety by reference.

BACKGROUND OF THE INVENTION

1. Field of the Invention

The present inventive concept relates to an image forming apparatus that supports a near field communication (NFC) function and a method of displaying a menu in the image forming apparatus.

2. Description of the Related Art

Near field communication (NFC) is a contactless short-range wireless communication standard between electronic devices within a short distance of 10 cm with low power consumption by using a frequency of 13.56 MHz, and was developed by the joint work of NXP Semiconductors of The Netherlands and Sony Corporation of Japan in 2002. A data transfer rate of NFC is 424 Kbps, the NFC has excellent security due to high proximity and encryption technology. NFC forgoes a complicated pairing process for recognition of devices but allows devices to recognize one another within $\frac{1}{10}$ of a second or less. In particular, NFC is a smart card type contactless wireless communication technology where radio frequency identification (RFID) technology is utilized. In addition, NFC builds upon RFID technology by allowing two-way communication as compared to smart cards, which are limited to one-way communication. NFC has a relatively large memory storage space and offers more variety of services. Accordingly, recently, commercialized electronic devices, such as smartphones and personal computers, in which the NFC technology is used, have been released.

SUMMARY OF THE INVENTION

The present inventive concept provides an image forming apparatus that supports a near field communication (NFC) function and a method of displaying a menu in such an image forming apparatus.

The present inventive concept also provides a computer-readable recording medium having embodied thereon a program to execute the method on a computer.

Additional features and utilities of the present general inventive concept will be set forth in part in the description which follows and, in part, will be obvious from the description, or may be learned by practice of the general inventive concept.

Exemplary embodiments of the present inventive concept provide an image forming apparatus that supports a near field communication (NFC) function, the image forming apparatus comprising: an NFC module to receive address book information stored in a user terminal by tagging the user terminal having the NFC function; a control unit to generate a quick menu in which at least one image forming function that is executable based on the received address book information from among image forming functions supported by the image forming apparatus is listed; and a user interface unit to display the generated quick menu.

Exemplary embodiments of the present inventive concept also provide a method of displaying a menu in an image forming apparatus that supports a near field communication (NFC) function, the method comprising: receiving address book information stored in a user terminal by tagging the user terminal having the NFC function; generating a quick menu in which at least one image forming function that is executable based on the received address book information from among image forming functions supported by the image forming apparatus is listed; and displaying the generated quick menu.

Exemplary embodiments of the present inventive concept also provide a non-transitory computer-readable recording medium having embodied thereon a program for executing the method described above.

Exemplary embodiments of the present inventive concept also provide an image forming apparatus configured to support a near field communication (NFC) function, the image forming apparatus comprising: an NFC module to receive address book information stored in a mobile electronic device by tagging the mobile electronic device having a NFC function; and a control unit to generate a quick menu listing image forming functions that are executable based on the received address book information from among image forming functions supported by the image forming apparatus.

In an exemplary embodiment, the control unit comprises: an address analyzing unit to analyze an NDEF message including the received address book information and to classify addresses within the address book information according to address types; a list determining unit to determine, among the addresses classified, image forming functions respectively corresponding to types of addresses present; and a quick menu generating unit to generate the quick menu based on the list of determined image forming functions.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 8 illustrates a result of classifying addresses included in address book information by an address analyzing unit according to types, according to an embodiment of the present inventive concept;

FIG. 14 is a detailed flowchart illustrating a method of generating a quick menu in an image forming apparatus, according to an embodiment of the present inventive concept;

DETAILED DESCRIPTION OF THE PREFERRED EMBODIMENTS

Figure 1A:
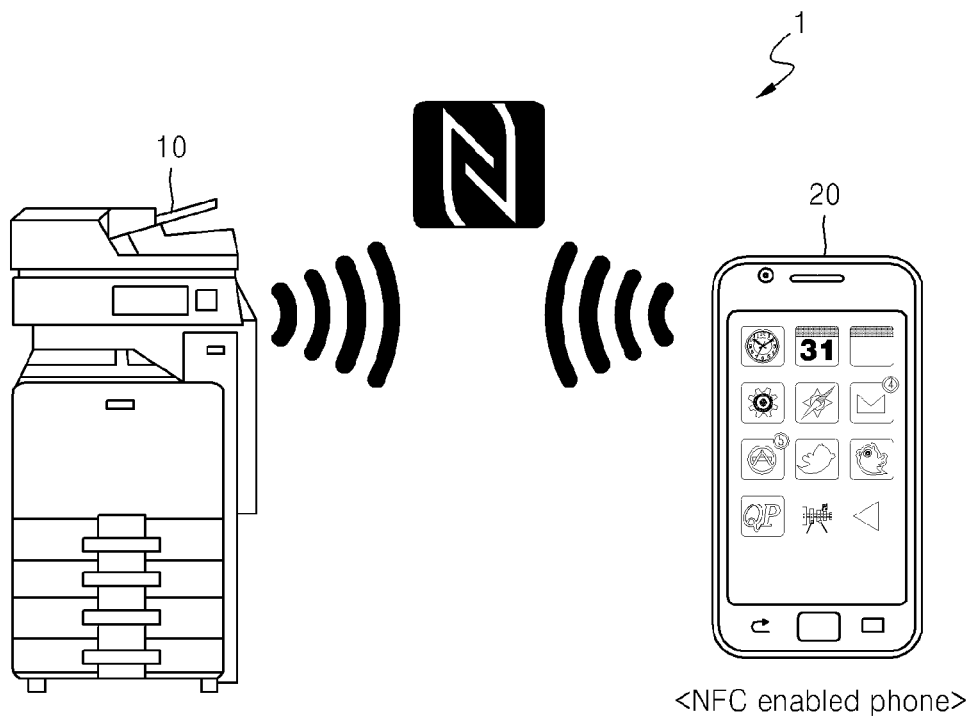
FIG. 1A illustrates a near field communication (NFC) environment according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1A illustrates a near field communication (NFC) environment 1 according to an embodiment of the present inventive concept. Referring to FIG. 1A, an image forming apparatus 10 and a smartphone 20 each supporting an NFC function are present in the NFC environment 1. An NFC tag can be embedded in the image forming apparatus 10 illustrated in FIG. 1 in advance, and thus communication between the image forming apparatus 10 and the smartphone 20 may be performed via NFC via the embedded NFC tag.

Figure 1B:
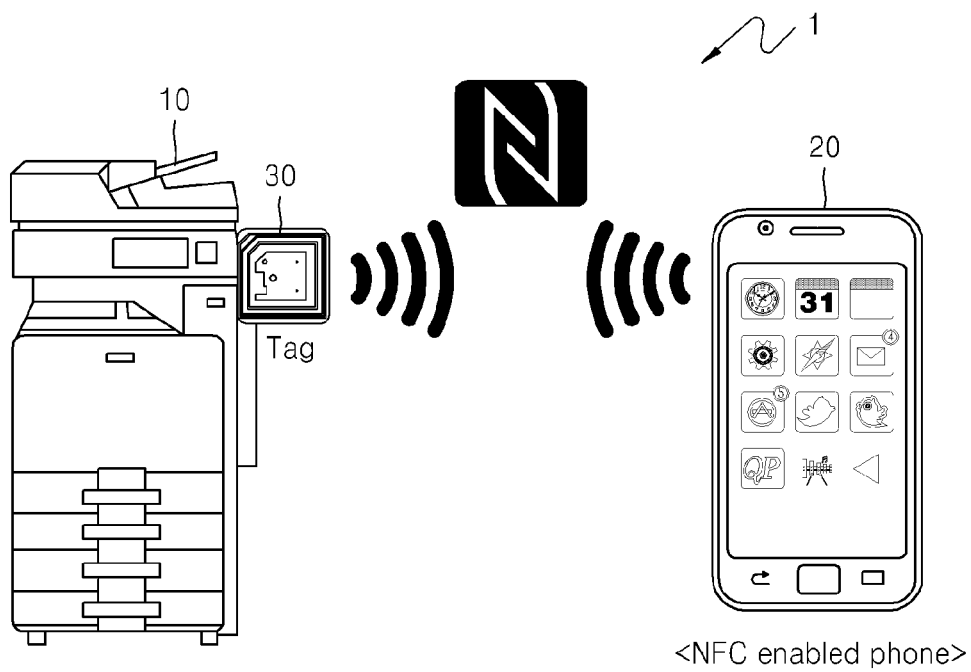
FIG. 1B illustrates an NFC environment which is similar to that of FIG. 1A, according to another embodiment of the present inventive concept.

FIG. 1B illustrates an NFC environment 1 which is similar to the NFC environment 1 FIG. 1A, according to an embodiment of the present inventive concept. Referring to FIG. 1B, an image forming apparatus 10 and a smartphone 20 each supporting an NFC function are also present in the NFC environment 1. In particular, an NFC tag is embedded in advance in the image forming apparatus 10 of FIG. 1A, whereas no NFC tag 30 is embedded in the image forming apparatus 10 in FIG. 1B in advance. Accordingly, the image forming apparatus 10 of FIG. 1B may communicate with the smartphone 20 via NFC only when an NFC tag 30 is installed later in the image forming apparatus 10 of FIG. 1B.

However, it is obvious to one of ordinary skill in the art that if an NFC tag 30 is installed later in the image forming apparatus 10 of FIG. 1B, then an operation of the NFC environment 1 of the current embodiment is identical to that of the NFC environment 1 of FIG. 1A, in which the NFC tag 30 is embedded in advance.

While just one pair of devices, that is, one image forming apparatus 10 and one smartphone 20, is present in the NFC environment 1 for convenience of description, more electronic devices of different types that support an NFC function may also be present in the NFC environment 1; these additional devices may also operate in the same manner of NFC as in the current embodiment of the present inventive concept, which would be obvious to one of ordinary skill in the art.

Figure 1C:
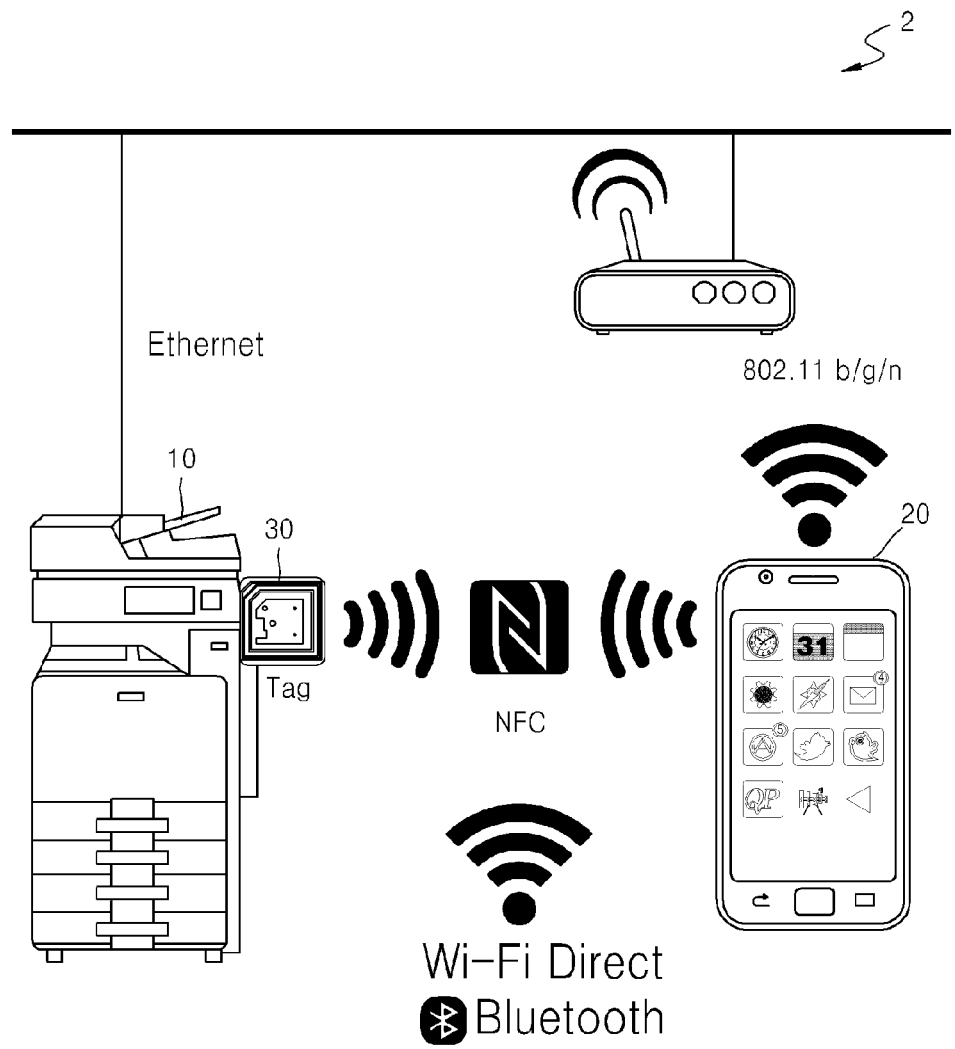
FIG. 1C illustrates a wireless communication environment in which an image forming apparatus and a smartphone are present, according to an embodiment of the present inventive concept.

FIG. 1C illustrates a wireless communication environment 2 in which an image forming apparatus 10 and a smartphone 20 are present, according to an embodiment of the present inventive concept. Referring to FIG. 10, other peripheral wired/wireless networks are illustrated in addition to the NFC environment 1 of FIG. 1A or 1B. The NFC environment 1 may operate in connection with peripheral wired/wireless networks, such as Wi-Fi Direct, Bluetooth, Ethernet, 802.11a/b/g/n, etc.

Before describing the current embodiment of the present inventive concept in detail, NFC technology will be described.

NFC is a contactless short-range wireless communication standard between electronic devices within a short distance of 10 cm with low power consumption by using a frequency of 13.56 MHz. A data transfer rate of an NFC system is 424 Kbps, and an NFC system has excellent security due to high proximity and encryption technology. NFC forgoes a complicated pairing process for recognition of devices but allows devices to recognize one another within ⅟10 second or less. In particular, NFC is a smart card type contactless wireless communication technology where radio frequency identification (RFID) technology is utilized. In addition, NFC builds upon RFID technology by allowing two-way communication, as compared to smart cards, which has only one-way communication, and has a relatively large memory storage space and offers more variety of services.

In detail, NFC is a wireless communication method in which data is directly exchanged between terminals, for example, between the image forming apparatus 10 and the smartphone 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmits the same to a reader. NFC communication allows a tag function according to necessity but also supports a function of recording information on the tag, and may be used in peer to peer (P2P) data exchange between terminals in which NFC is set.

Figure 2A:
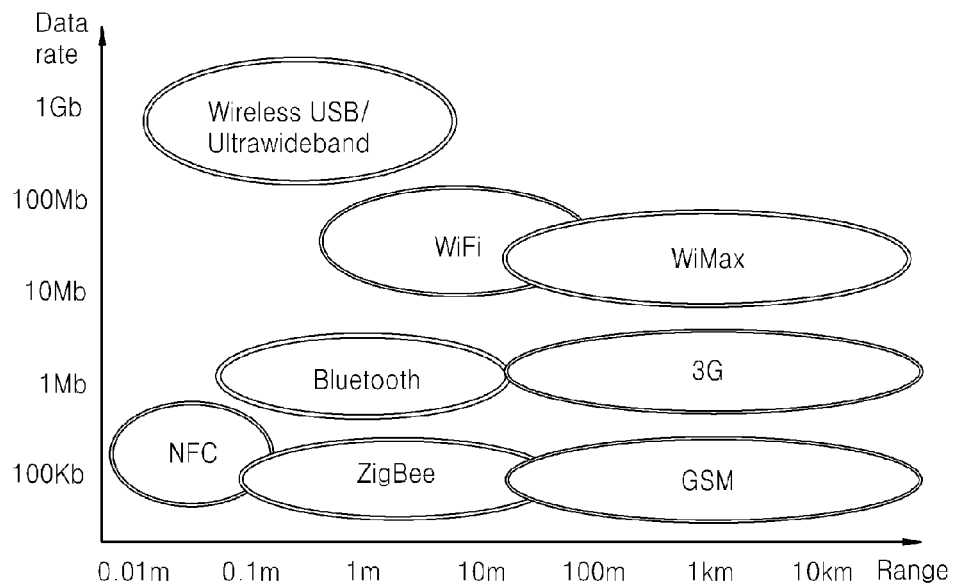
FIG. 2A is a graph comparing data rates and communication ranges of NFC and other wireless communication methods.

NFC which is developed based on RFID may be compared with other wireless communication methods, such as Wi-Fi Bluetooth, ZigBee, etc., as shown in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as shown in Table 1 below.

TABLE 1

| Technology | Frequency used | security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency and security. For example, when NFC and Bluetooth technology are combined, NFC may be used in connecting terminals (authorization) and Bluetooth may be used in data transmission between the terminals to thereby enable more efficient communication between the devices.

Figure 2B:
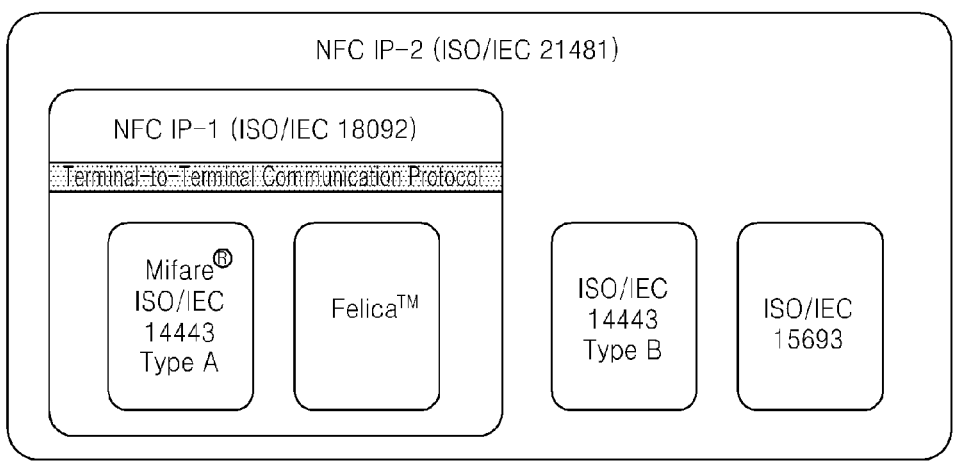
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
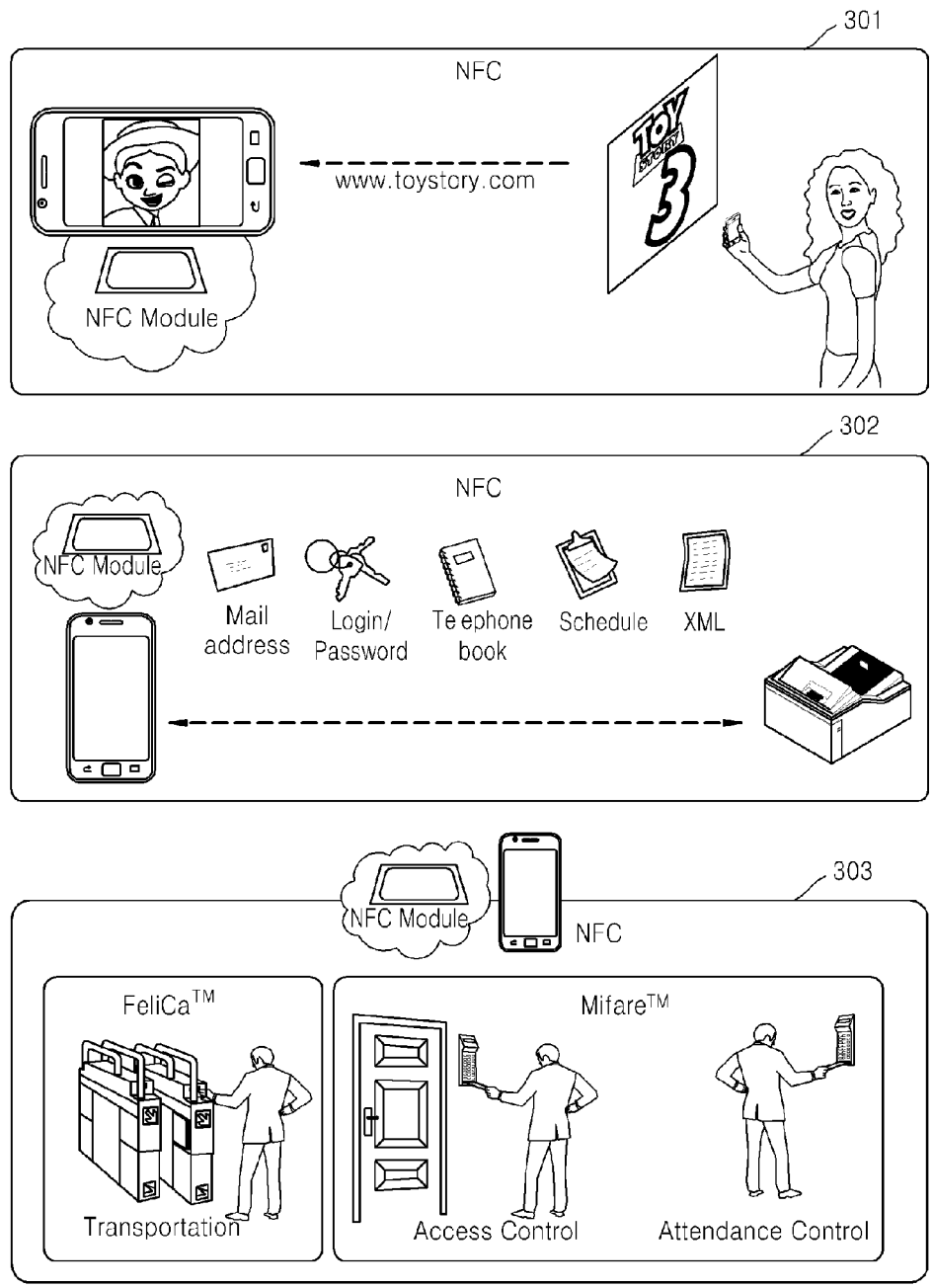
FIGS. 3A and 3B are diagrams explaining three communication modes of NFC.
Figure 3B:
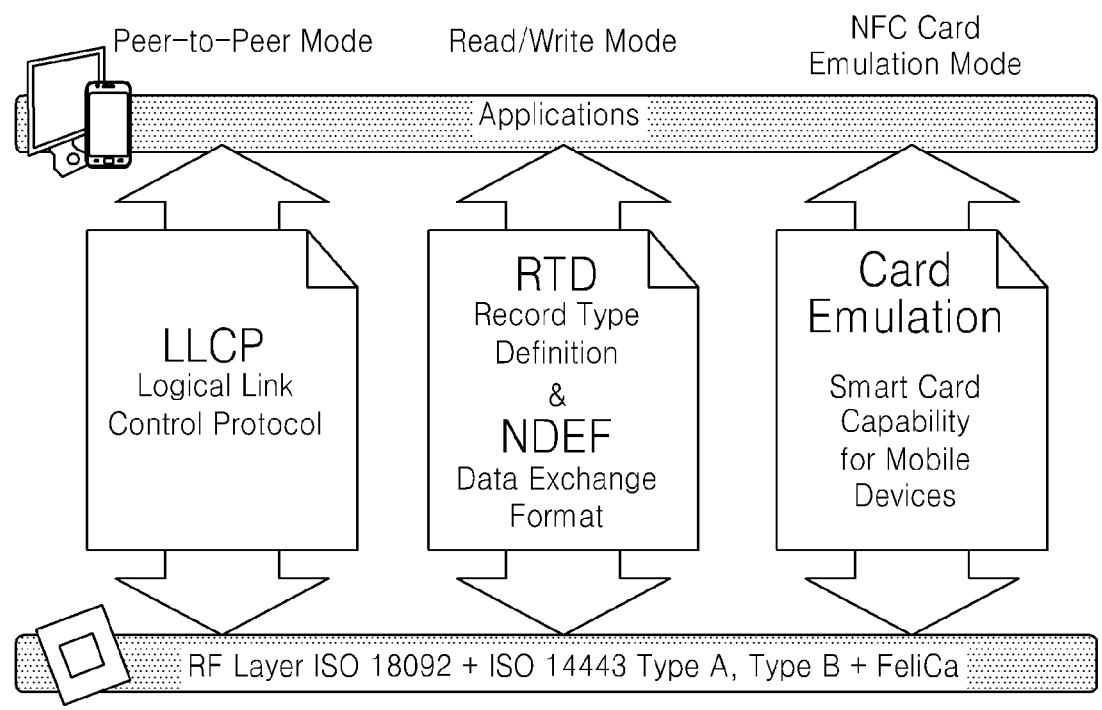

FIGS. 3A and 3B are diagrams explaining three communication modes of an NFC system.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below.

TABLE 2

| | ISO/IEC 15693 | ISO/IEC 18092 | ISO/IEC 14443 |
|---|---|---|---|
| Operational mode | communication between reader and tag (VCD2 mode) | communication between devices (P2P mode) | communication between reader and tag (PCD1 mode) |
| Power supply | Manual | active and manual | manual |
| Range of communication | 1 m | 10-20 cm | 10 cm |

TABLE 2-continued

| | ISO/IEC 15693 | ISO/IEC 18092 | ISO/IEC 14443 |
|---|---|---|---|
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 301 supports that case where the smartphone 20, in which an NFC tag is embedded, operates as a reader to read another NFC tag or operates as a writer to input information to another NFC tag.

In the P2P mode 302, communication at a link level between two NFC terminals, for example, between the image forming apparatus 10 and the smartphone 20, is supported. To establish a connection, a client (NFC P2P initiator, the smartphone 20) searches for a host (NFC P2P target, the image forming apparatus 10) and transmits data of an NFC Data Exchange format (NDEF) message format. In the P2P mode 302, data, such as emails, schedules, telephone numbers, and XML data, may be exchanged just by touching the image forming apparatus 10 with the smartphone 20.

Further, in the Card Emulation mode 303, the smartphone 20, in which an NFC tag is embedded, operates as a smart card (ISO/IEC 14443). Accordingly, NFC is compatible not only with ISO 14443, which is the international standard for contactless cards, but also with Felica by Sony and MiFare by Philips.

In order to coordinately provide the three communication modes of NFC, a protocol is standardized as illustrated in FIG. 3B. Referring to FIG. 3B, a software structure in a NFC system is illustrated.

Logical Link Control Protocol (LLCP) is a protocol that sets a communication connection between layers and controls the same. A NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record Type Definition (RTD) defines a record type and a type name which may correspond to an NDEF record.

Figure 4:
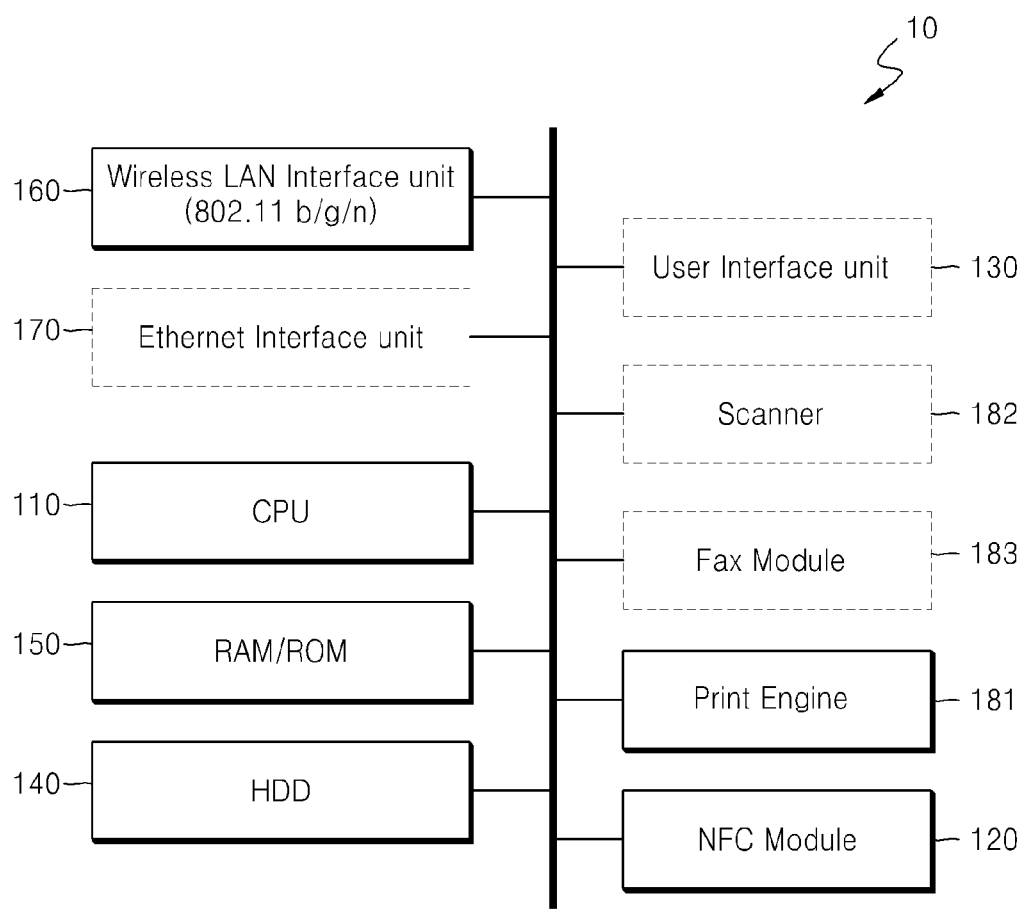
FIG. 4 is a block diagram illustrating a basic hardware structure of an image forming apparatus supporting an NFC function, according to an embodiment of the present inventive concept.

FIG. 4 is a block diagram illustrating a basic hardware structure of the image forming apparatus 10 supporting an NFC function, according to an embodiment of the present inventive concept. Referring to FIG. 4, the image forming apparatus 10 may include a central processing unit (CPU) 110, an NFC module 120, a user interface unit 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 10 supports only WLAN, the Ethernet interface unit 170 may not be included. Also, if the image forming apparatus 10 is a printer, the scanner 182 and the fax module 183 may not be included.

The CPU 110 controls the overall operation of the image forming apparatus 10, and information needed to control and print data is stored in the HDD 140 and the RAM/ROM 150 and read therefrom when necessary.

The user interface unit 130 is hardware used as a medium for the user when the user checks information of the image forming apparatus 10 and inputs a command to the image forming apparatus 10. The user interface unit 130 may be designed in various manners according to products; for example, it may be formed in a simple form of two or four lines on a display, such as a liquid crystal display (LCD) or light emitting diode (LED), or as a graphic user interface (GUI), so as to enable various graphical representations.

The WLAN interface unit 160 refers to hardware that performs IEEE 802.11 b/g/n functionality, and may communicate with a main board of the image forming apparatus 10 via a universal serial bus (USB) or the like. The WLAN interface unit 160 may also support Wi-Fi Direct at the same time.

The Ethernet interface unit 170 refers to hardware that performs wired Ethernet communication according to IEEE 802.3.

The print engine 181, the scanner 182, and the fax module 183 refer to hardware to perform a printing function, a scanning function, and a fax function, respectively.

In particular, the image forming apparatus 10 includes the NFC module 120 to thereby communicate with other NFC devices, such as the smartphone 20, via NFC. The NFC module 120 is in charge of the NFC functions and may read from or write data to an NFC tag of another device. Also, communication with the main board of the image forming apparatus 10 is performed by using a Universal Asynchronous Receiver/Transmitter (UART), an Inter Integrated Circuit (I2C), a Serial Peripheral Interface Bus (SPI), or the like. As described above with reference to FIGS. 1A and 1B, the NFC module 120 may be embedded in the image forming apparatus 10 in advance at the time of factory shipment, or may be installed by the user of the NFC tag 30 at a later point in time.

Although not shown in FIG. 4, the image forming apparatus 10 may also include other wireless communication modules, such as a Bluetooth module or a ZigBee module.

Figure 5:
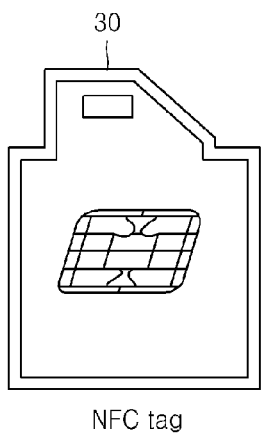
FIG. 5 illustrates an NFC tag and information stored in the NFC tag installed in the image forming apparatus of FIG. 1B.

FIG. 5 illustrates an example of the NFC tag 30 installed in the image forming apparatus 10 of FIG. 1B and information 510 stored in the NFC tag 30. Referring to FIG. 5, in the case of the image forming apparatus 10 of FIG. 1B, the NFC function may be utilized when the NFC tag 30 is inserted into a slot that is provided in advance in the image forming apparatus 10. The information 510 of the NFC tag 30, for example, performance information of the image forming apparatus 10, may be recorded by other NFC devices in the Reader/Writer mode 301 or may be stored in advance by a manager.

An image forming apparatus 60 supporting an NFC function according to another embodiment of the present inventive concept and detailed functions and operations thereof and a method of displaying a menu in the image forming apparatus 60 will be described in detail with reference to the drawings below.

Figure 6:
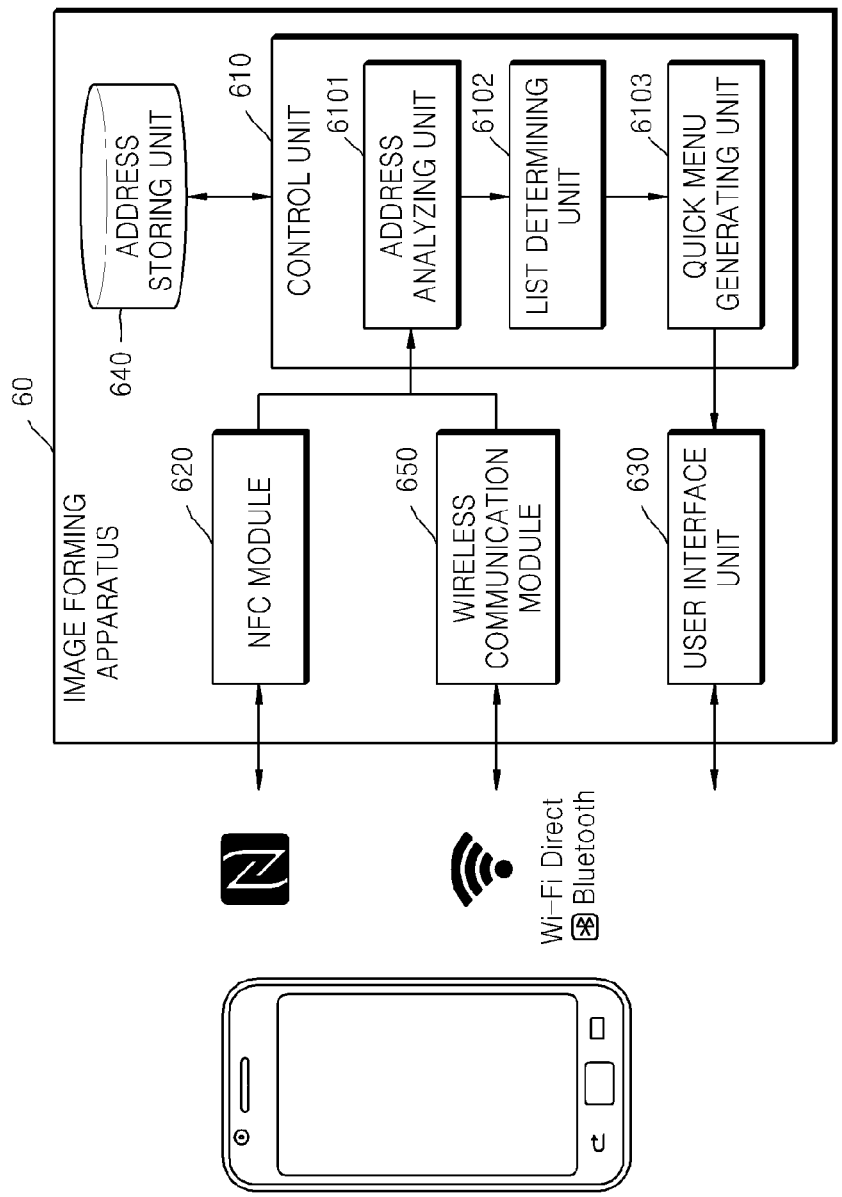
FIG. 6 is a block diagram illustrating a hardware structure of an image forming apparatus in which a user terminal is tagged to pop up a quick menu, according to an embodiment of the present inventive concept.

FIG. 6 is a block diagram illustrating a hardware structure of the image forming apparatus 60 in which a user terminal 20 is tagged to push a quick menu, according to an embodiment of the present inventive concept.

In FIG. 6, only hardware components related to the current embodiment of the present inventive concept will be described in order to prevent obscuring the characteristics of the current embodiment. However, it is well known to those of ordinary skill in the art that other general-use hardware components than the illustrated hardware components may also be included.

Referring to FIG. 6, the image forming apparatus 60 is illustrated as including just hardware components related to the current embodiment from among the hardware components of the image forming apparatus 10 illustrated in FIG. 4. However, it is well known to those of ordinary skill in the art that elements that are omitted in FIG. 6 but described with reference to the image forming apparatus 10 of FIG. 4 may also be applied to the image forming apparatus 60.

The image forming apparatus 60 includes a control unit 610, an NFC module 620, a user interface unit 630, an address storing unit 640, and a wireless communication module 650. Referring to FIG. 6, the control unit 610 corresponds to the CPU 110 of FIG. 4, and the NFC module 620 corresponds to the NFC module 120 of FIG. 4, and the user interface unit 630 corresponds to the user interface unit 130 of FIG. 4, and the address storing unit 640 corresponds to the HDD 140 of FIG. 4. The wireless communication module 650 refers to any hardware that uses other wireless communication methods than NFC, such as a Bluetooth module or a ZigBee module.

The NFC module 620 recognizes access of the user terminal 20 having an NFC function according to an NFC protocol. In order to activate the NFC function and set a connection, a predetermined NFC device corresponding to a client (the user terminal 20) has to access another NFC device corresponding to a host (the image forming apparatus 60) within a proximity range of 10 cm.

Accordingly, the NFC module 620 recognizes access of the user terminal 20 to tag the user terminal 20, and receives an address book stored in the user terminal 20. Here, as described above, the NFC module 620 also receives address book information included in an NDEF message upon receiving an NDEF message defined according to the NFC standards from the user terminal 20.

Figure 7:
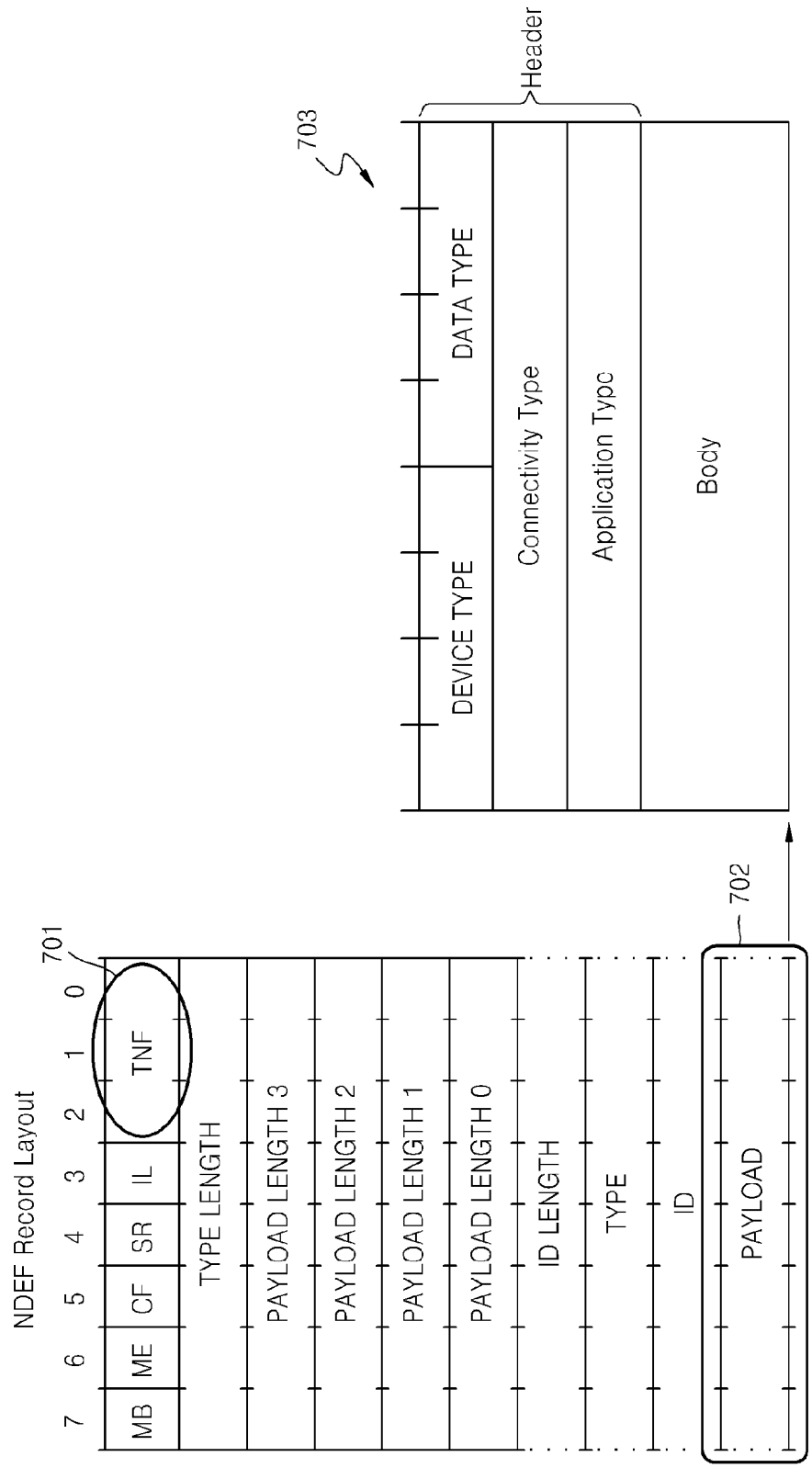
FIG. 7 illustrates an NFC Data Exchange Format (NDEF) message received by an NFC module according to an embodiment of the present inventive concept.

FIG. 7 illustrates an NDEF message received by the NFC module 620 according to an embodiment of the present inventive concept.

Referring to FIG. 7, a record layout of the NDEF message is defined by RTD as described above with reference to the NFC standards. The NDEF message includes a Type Name Format (TNF) field, a PAYLOAD field, etc. The PAYLOAD field of the NDEF message is formed of a plurality of header fields and a plurality of body fields.

In particular, according to the current embodiment, address book information, such as a fax number, an email address, a telephone number, a server address, and a universal resource locator (URL) address stored in the user terminal 20, may be included in the body fields.

The image forming apparatus 60 generates a quick menu by using the address book information of the PAYLOAD field received by the NFC module 620.

Referring to FIG. 6, the control unit 610 generates a quick menu in which at least one image forming function that is executable based on the received address book information from among image forming functions supported by the image forming apparatus 60 is listed. In particular, the control unit 610 may generate a quick menu displaying a list of executable image forming functions based on address types included in the received address book information. This will be further described in detail later.

Examples of image forming functions supported by the image forming apparatus 60 include printing, scanning, photocopying, faxing, a scan to email function, a scan to server function, a scan to URL function, a scan to PC function, a scan to shared folder function, and a workflow function. Here, a destination of the image forming functions of the image forming apparatus 60 may be various as a fax number, an email address, and a server address. Accordingly, the address book information stored in the user terminal 20 may be used according to the address types.

The control unit 610 includes an address analyzing unit 6101, a list determining unit 6102, and a quick menu generating unit 6103. The control unit 610 may be a processor implemented by an array of a plurality of logic gates, or a general-use micro-processor. That is, it is well known to those of ordinary skill in the art that the control unit 610 may be implemented in various forms of hardware.

The address analyzing unit 6101 analyzes an NDEF message received from the user terminal 20 via the NFC module 620. In particular, according to the current embodiment, description will focus on a TNF field and a PAYLOAD field, and an analysis of other fields of an NDEF message which are well known to those of ordinary skill in the art will be omitted.

The address analyzing unit 6101 parses a PAYLOAD field to analyze a header and a body of the PAYLOAD field. The address book information stored in the user terminal 20 may be included in the body field of the PAYLOAD field. The address analyzing unit 6101 parses the address book information included in the body field of the PAYLOAD field.

After the parsing is performed, the address analyzing unit 6101 obtains address book information received from the user terminal 20. The obtained address information may mixedly include a fax number, an email address, and a server address without being classified according to address types. The address analyzing unit 6101 analyzes the address types of addresses included in the address book information to classify the addresses according to address types.

FIG. 8 illustrates a result of classifying the addresses included in the address book information by the address analyzing unit 6101 according to address types, according to an embodiment of the present inventive concept. Referring to FIG. 8, as a result of the classification by the address analyzing unit 6101, a phone address, a fax address, an email address, a server address, a URL address, and WORKFORM information, and the like are classified according to the address types.

Referring back to FIG. 6, the address storing unit 640 classifies addresses included in the received address book information and stores the same according to the classification. That is, the address storing unit 640 stores a result of classifying addresses, such as a phone address, a fax number, an email address, a server address, a URL address, and a WORKFORM address which are the result of analyzing, and the stored classification result is used in generating a quick menu.

The list determining unit 6102 maps each executable image forming function according to the analyzed types to determine a list of image forming functions that are to be included in the quick menu.

In detail, regarding the image forming functions of the image forming apparatus 60, to perform each image forming function, a destination address to execute corresponding image forming functions is required; that is, to perform a fax function, a fax number is required, and to perform a scan to email function, an email address is required, and to perform a scan to server function, a server address is required.

The destination address originally has to be input directly by the user via the user interface unit 630 of the image forming apparatus 60. That is, when a user intends to perform a predetermined image forming function, it is inconvenient for the user to have to individually check address book information stored in the user terminal 20 one by one and input the information to the user interface unit 630. However, according to the current embodiment, as the address book information of the user terminal 20 analyzed by using the address analyzing unit 6101 may be used as a destination address, there is no need to receive the addresses directly from the user.

The list determining unit 6102 determines, among the addresses classified by the address analyzing unit 6101, image forming functions respectively corresponding to types of addresses that are present. That is, a fax address, an email address, and a server address classified by the address analyzing unit 6101 respectively correspond to destination addresses for executing the fax function, the scan to email function, and the scan to server function.

For example, if there are addresses corresponding to the type of the fax address from among the addresses classified by the address analyzing unit 6101, the list determining unit 6102 determines a fax function as an item of a quick menu. Also, if there are addresses corresponding to the email address and the server address from among the addresses classified by the address analyzing unit 6101, the list determining unit 6102 determines the scan to email function and the scan to server function as additional items of the quick menu.

As described above, the list determining unit 6102 determines corresponding image forming functions from among the image forming functions supported by the image forming apparatus 60 based on the types of addresses that are classified by the address analyzing unit 6101.

The quick menu generating unit 6103 generates a quick menu based on the list of the determined image forming functions. As has been described above, when the list determining unit 6102 determines the fax function, the scan to email function, and the scan to server function, image forming functions, such as faxing, the scan to email function, and the scan to server function, are included in the quick menu generated by the quick menu generating unit 6103.

The user interface unit 630 displays the quick menu generated by the quick menu generating unit 6103. The user interface unit 630 may display the generated quick menu by pushing the same on a screen of the user interface unit 630 as a popup window.

Figure 9:
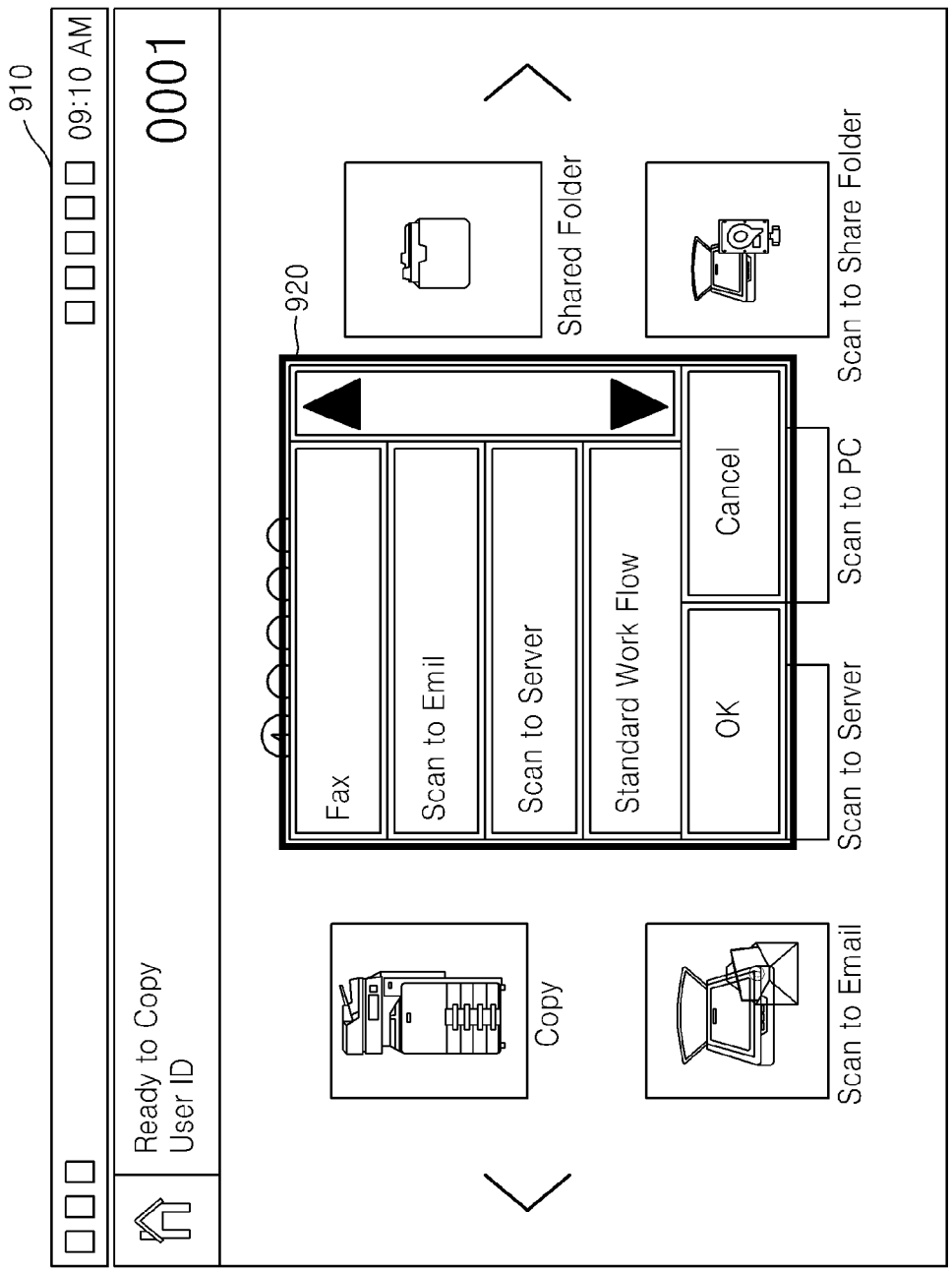
FIG. 9 illustrates a quick menu displayed on a user interface unit, according to an embodiment of the present inventive concept.

FIG. 9 illustrates a quick menu 920 displayed on the user interface unit 630, according to an embodiment of the present inventive concept. Referring to FIG. 9, before the image forming apparatus 60 and the user terminal 20 are connected via NFC, a general screen 910 about image forming functions supported by the image forming apparatus 60 is displayed on the user interface unit 630. However, when a connection is set as the user terminal 20 accesses the image forming apparatus 60 via NFC, the quick menu 920 pushes to be displayed as a popup window.

As has been described above, the list of image forming functions of the quick menu 920 may include image forming functions, such as a fax function, a scan to email function, and a scan to server function respectively corresponding to the fax address, the email address, and server addresses present in the address book information received from the user terminal 20. When WORKFORM information is received from the user terminal 20, a Standard WorkFlow may also be included in the quick menu 920.

As such, when a connection is set via NFC, the quick menu 920 is automatically pushed via the user interface unit 630 of the image forming apparatus 60, and thus the user may not have to input the address book information stored in the user terminal 20 directly to the user interface unit 630 of the image forming apparatus 60.

Referring back to FIG. 6, the user interface unit 630 receives a user selection regarding at least one image forming function that a user intends to perform, from among the image forming functions of the displayed quick menu. That is, the user interface unit 630 may receive an image forming function or a plurality of image forming functions at one time from the user. Here, when a plurality of image forming functions are received at one time, the WorkFlow function may be activated in the image forming apparatus 60.

When a predetermined image forming function is selected via the user interface unit 630, the user interface unit 630 displays a screen to set specific options by using the address book information that is mapped on the selected image forming function.

In detail, when the user selects the fax function on the quick menu, the user interface unit 630 lists fax addresses that are classified by the address analyzing unit 6101 and displays the same. Also, when the user selects the scan to email function and the scan to server function on the quick menu, the user interface unit 630 lists email addresses and server addresses that are classified by the address analyzing unit 6101 and displays the same. The information stored in the address storing unit 640 may be used as a list of addresses classified as above.

Figure 10A:
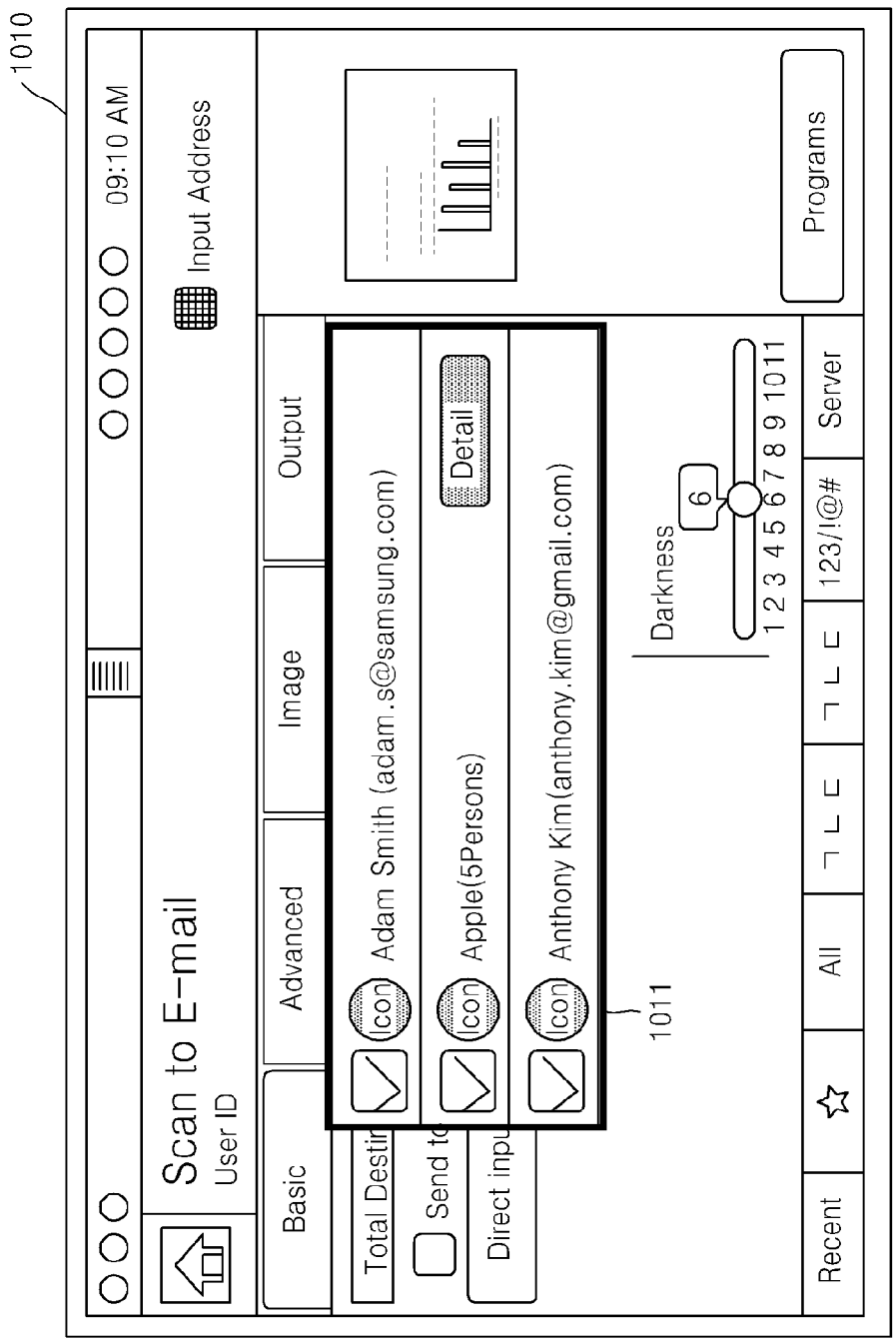
FIG. 10A illustrates a screen of a user interface unit when a scan to email function is selected on a quick menu, according to an embodiment of the present inventive concept.

FIG. 10A illustrates a screen 1010 of the user interface unit 630 when the scan to email function is selected on the quick menu, according to an embodiment of the present inventive concept. Referring to FIG. 10A, when the scan to email function is selected, the user interface unit 630 lists addresses 1011 classified by the address analyzing unit 6101 and displays the same as a list of destinations of the scan to email function. Accordingly, the user may select a desired email address via the user interface unit 630 to perform the scan to email function.

Figure 10B:
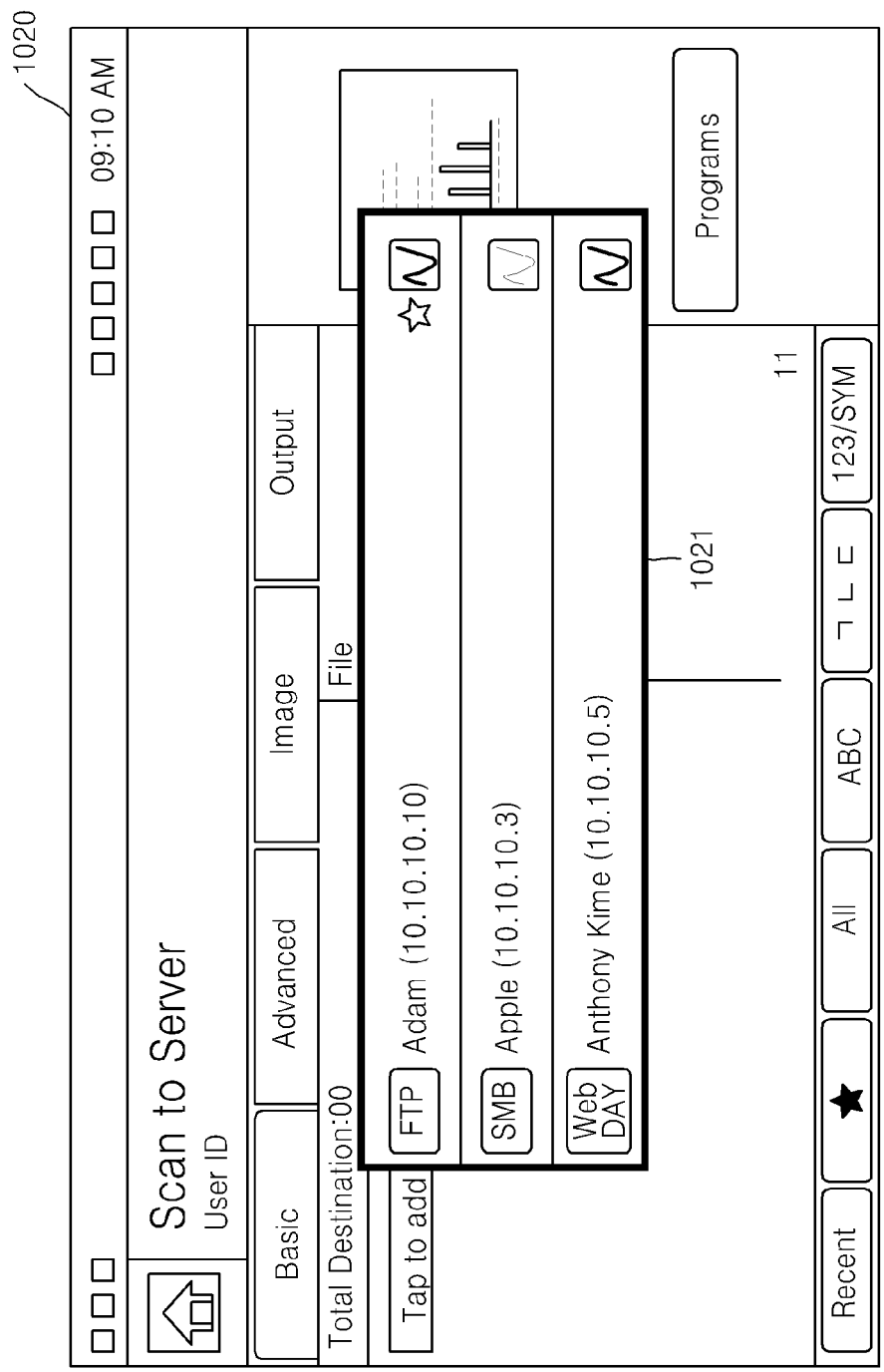
FIG. 10B illustrates a screen of a user interface unit when a scan to server function is selected on a quick menu, according to an embodiment of the present inventive concept.

FIG. 10B illustrates a screen 1020 of the user interface unit 630 when a scan to server function of a quick menu is selected, according to an embodiment of the present inventive concept. Referring to FIG. 10A, when the scan to server function is selected, the user interface unit 630 lists server addresses 1021 that are received from the user terminal 20 and are classified by the address analyzing unit 6101 and displays the same as a list of destinations of the scan to server function. Accordingly, the user may select a desired server address via the user interface unit 630 to perform the scan to server function.

Figure 11A:
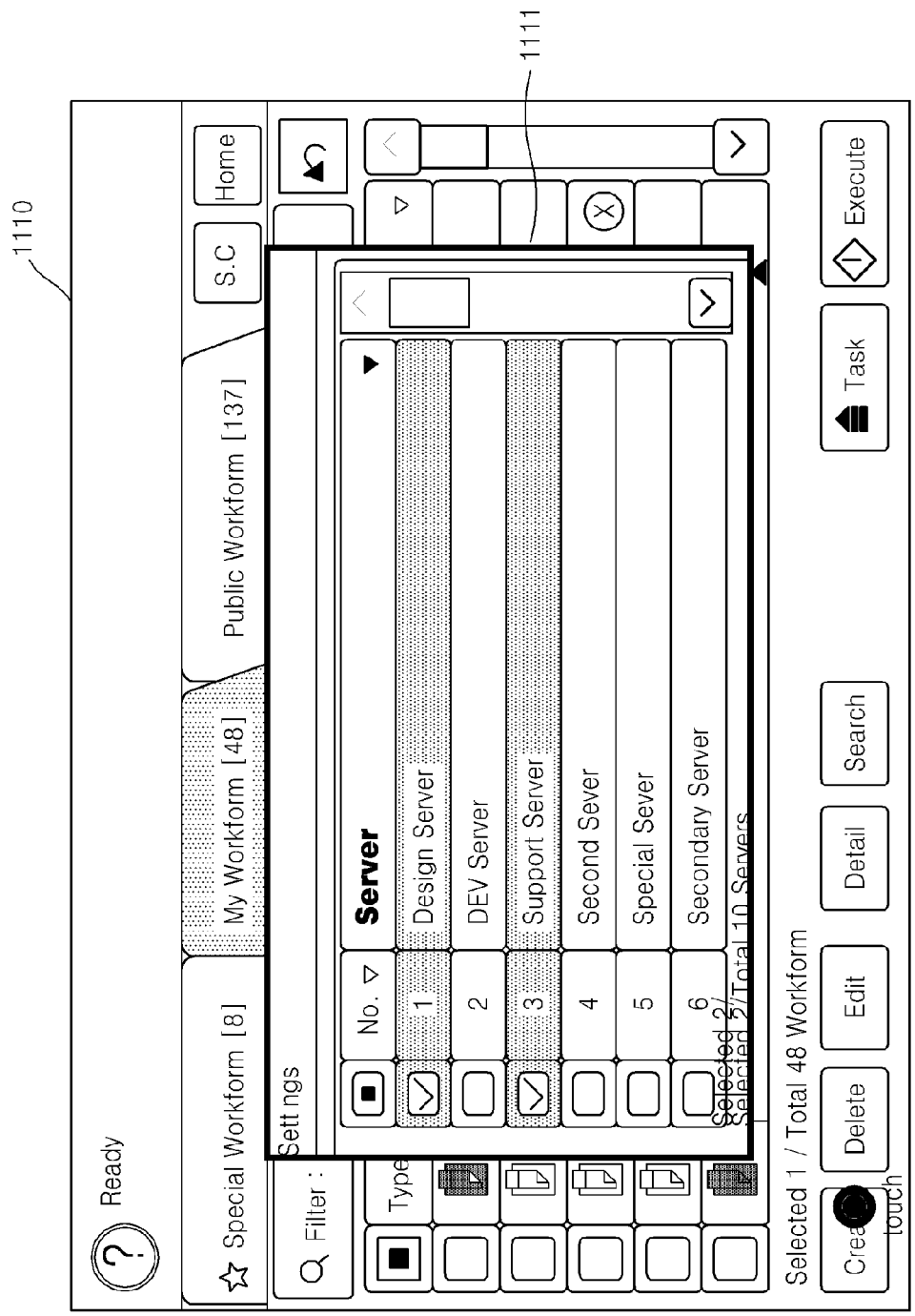
FIGS. 11A and 11B illustrate screens of a user interface unit when a Standard WorkFlow function of a quick menu is selected, according to an embodiment of the present inventive concept.
Figure 11B:
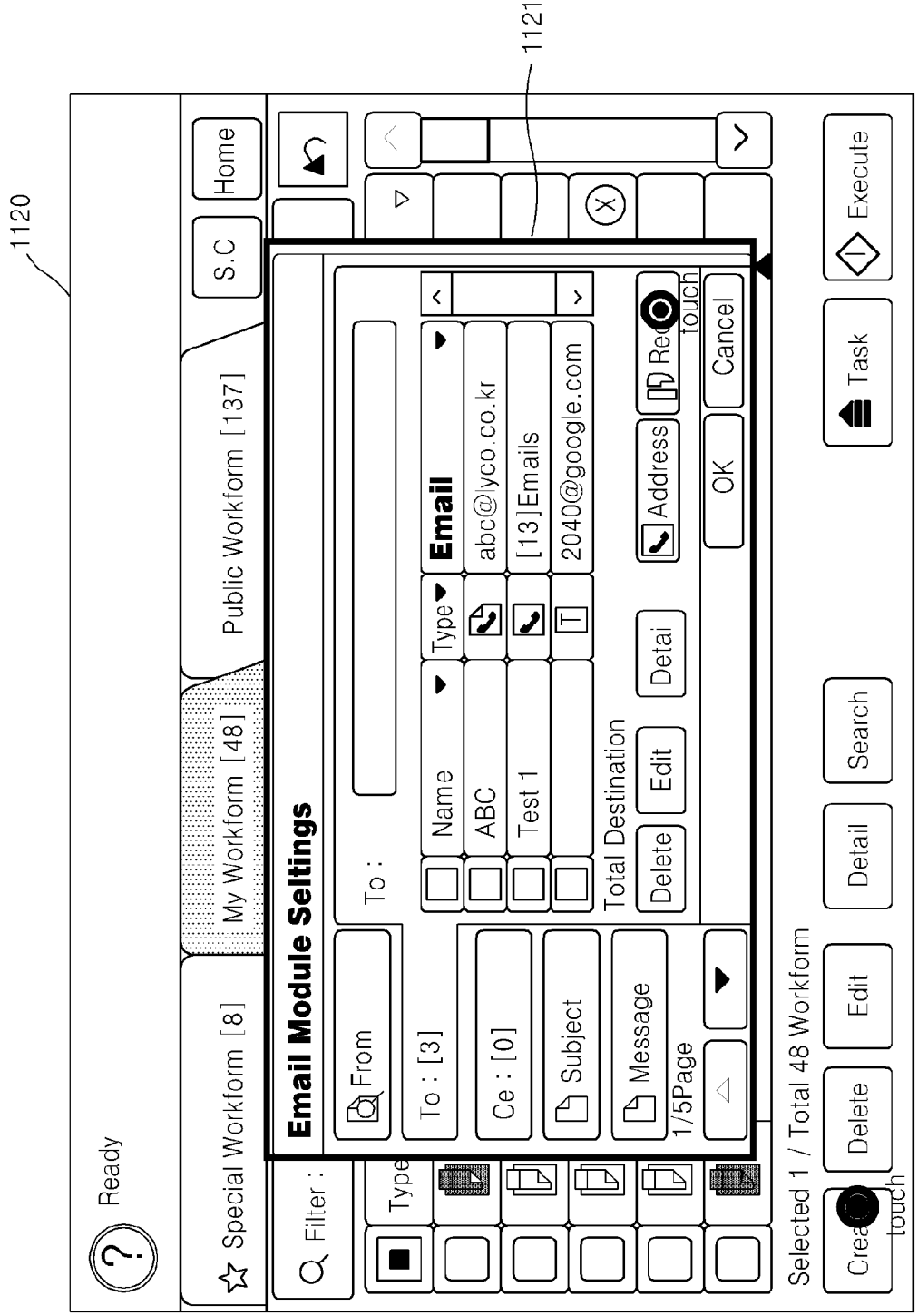

FIGS. 11A and 11B illustrate screens 1110 and 1120 of the user interface unit 630 when a Standard WorkFlow function is selected on the quick menu, according to an embodiment of the present inventive concept. Referring to FIGS. 11A and 11B, when the scan to server function and the scan to email function are selected, the Standard WorkFlow function is activated, and the screens 1110 and 1120 to set specific options to execute the scan to server function and the scan to email function at the same time are displayed on the user interface unit 630.

Referring to FIG. 11A, as destinations of the scan to server function, a list 1111 of server addresses that are received from the user terminal 20 and classified by the address analyzing unit 6101 is displayed, and referring to FIG. 11B, a list 1121 of email addresses that are received from the user terminal 20 and classified by the address analyzing unit 6101 is displayed as destinations of the scan to email function.

The screen configuration of the user interface unit 630 of FIGS. 9, 10A, 10B, 11A, and 11B is an example, and may also be modified in other forms, which is obvious to one of ordinary skill in the art.

Referring back to FIG. 6, the image forming apparatus 60 may perform image forming functions that are selected on the quick menu, such as printing, scanning, photocopying, faxing, scan to email, scan to server, scan to URL, scan to PC, scan to shared folder, and WorkFlow, by using the hardware components of the image forming apparatus 10 illustrated in FIG. 4, such as the WLAN interface unit 160, the Ethernet interface unit 170, the print engine 181, the scanner 182, and the fax module 183.

After the address analyzing unit 6101 analyzes the NDEF message, not all of address book information may be included in the PAYLOAD field of the NDEF message. This may be when the address book information stored in the user terminal 20 is of a large capacity and thus a long time is required for data transmission via NFC or when data transmission is not possible for some reason. Here, the image forming apparatus 60 may receive a large amount of address book information by using the wireless communication module 650.

In this case, the address analyzing unit 6101 determines whether to additionally receive address book information stored in the user terminal 20 by using the wireless communication module 650 included in the image forming apparatus 60 based on a TNF field value of the NDEF message received via the NFC module 620.

The address analyzing unit 6101 determines to use the wireless communication module 650 when the TNF field value denotes unknown (e.g., 0x05). The wireless communication module 650 additionally receives address book information from the user terminal 20 by using a wireless communication method, such as Wi-Fi, Wi-Fi Direct, or Bluetooth.

The list determining unit 6102 and the quick menu generating unit 6103 determine a list of image forming functions based on the address book information that is additionally received via the wireless communication module 650 and generates a quick menu.

Figure 12:
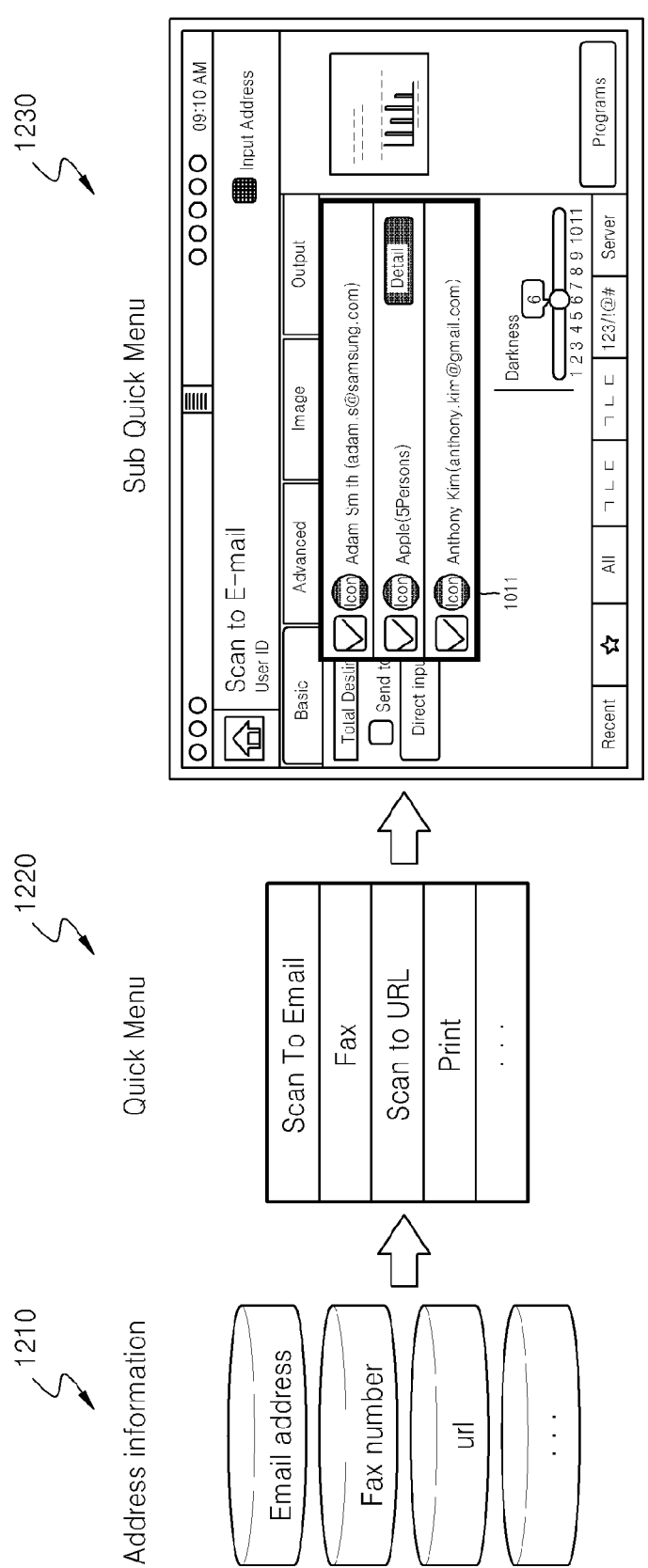
FIG. 12 is a schematic view of an operation of generating a quick menu in an image forming apparatus, according to an embodiment of the present inventive concept.

FIG. 12 is a schematic view of an operation of generating a quick menu in the image forming apparatus 60, according to an embodiment of the present inventive concept.

Referring to FIG. 12, address book information 1210 received via the NFC module 620 is classified according to address types by the address analyzing unit 6101, and the address storing unit 640 stores the classified addresses according to the address types.

The list determining unit 6102 determines image forming functions corresponding to the classified types of addresses that are present in the address book information 1210, and the quick menu generating unit 6103 generates a quick menu 1220 based on the list of the determined image forming functions. The user interface unit 630 displays the quick menu 1220 by pushing the same as a popup window.

When the user selects a desired image forming function, the user interface unit 630 displays a screen to set specific options to execute the selected image forming function.

Figure 13:
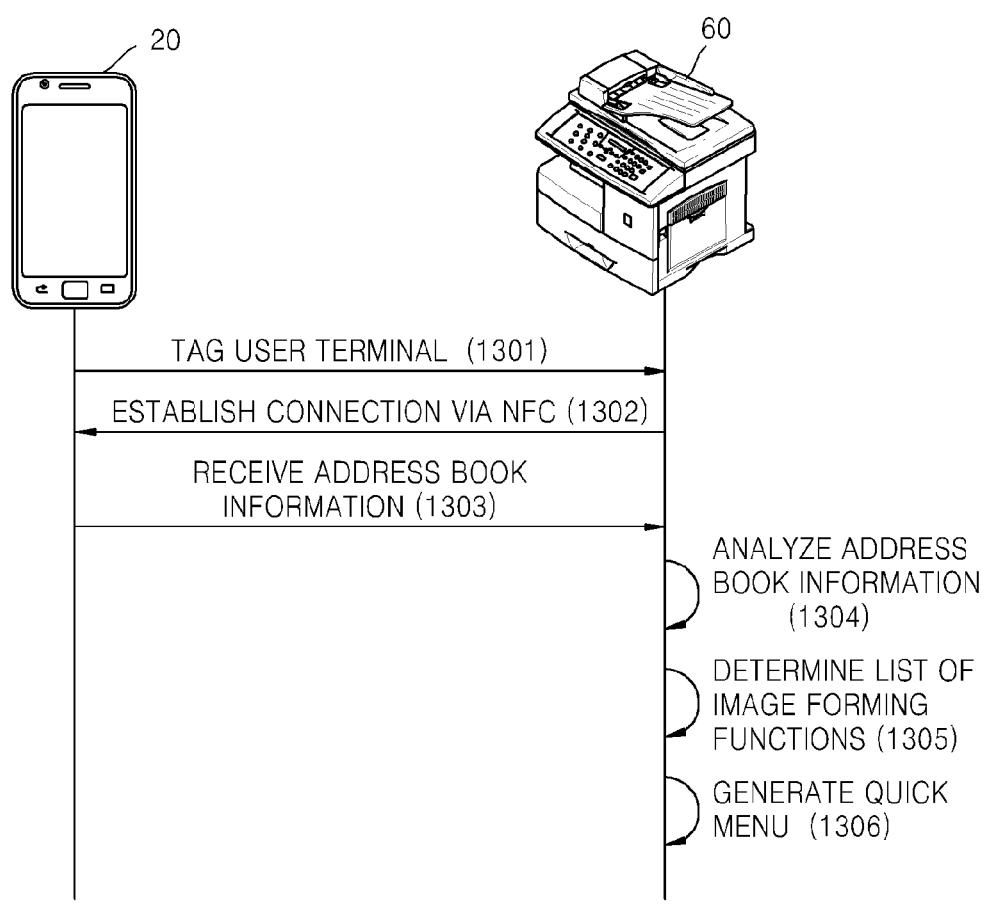
FIG. 13 illustrates a process of generating a quick menu in an image forming apparatus according to an embodiment of the present inventive concept.

FIG. 13 illustrates an operation of generating a quick menu in the image forming apparatus 60 according to an embodiment of the present inventive concept.

In operation 1301, when the user terminal 20 is at a close distance to the image forming apparatus 60 by 10 cm or less, the image forming apparatus 60 tags the user terminal 20 by using an NFC function.

In operation 1302, the image forming apparatus 60 establishes an NFC connection with respect to the user terminal 20.

In operation 1303, the image forming apparatus 60 receives address book information from the user terminal 20 via an NFC protocol. The received address book information may be included in an NDEF message.

In operation 1304, the image forming apparatus 60 extracts address book information by analyzing the received NDEF message, and classifies addresses of the extracted address book information according to address types.

In operation 1305, the image forming apparatus 60 determines a list of image forming functions corresponding to the address types of the classified addresses.

In operation 1306, the image forming apparatus 60 generates a quick menu based on the list of the determined image forming functions.

FIG. 14 is a detailed flowchart illustrating a method of generating a quick menu in the image forming apparatus 60, according to an embodiment of the present inventive concept. Referring to FIG. 14, the method of generating a quick menu includes operations that are performed in the image forming apparatus 60 in a time series manner, and thus a description is omitted herein, but the description which has been provided above with reference to FIG. 6 may also be applied to the method of generating a quick menu of FIG. 14.

In operation 1401, the NFC module 620 determines whether the user terminal 20 is tagged via the NFC protocol. When the user terminal 620 is tagged, the NFC module 620 receives an NDEF message and address book information included in the NDEF message.

In operation 1402, the address analyzing unit 6101 analyzes the received NDEF message to extract address book information, and classifies addresses of the extracted address information according to address types.

In operation 1403, the list determining unit 6102 determines whether an image forming function corresponding to the classified address types of addresses exists. The list determining unit 6102 determines a list of image forming functions to be included in the quick menu if corresponding image forming functions are present.

In operation 1404, the quick menu generating unit 6103 generates a quick menu based on the determined list of image forming functions.

In operation 1405, the control unit 610 determines whether the user has selected an image forming function on the quick menu via the user interface unit 630.

In operation 1406, the quick menu generating unit 6103 generates a screen to set a specific option for a selected image forming operation. Here, the specific option refers to the list of addresses mapped on the selected image forming function, and may correspond to the address book information stored in the address storing unit 640.

In operation 1407, the control unit 610 determines whether a set up of a specific option on a screen to set a specific option via the user interface unit 630 is completed.

In operation 1408, the control unit 610 controls the typical hardware components of the image forming apparatus 10 illustrated in FIG. 4, that is, the WLAN interface unit 160, the Ethernet interface unit 170, the print engine 181, the scanner 182, and the fax module 183, to perform selected image forming functions on the quick menu according to the set specific option.

Figure 15A:
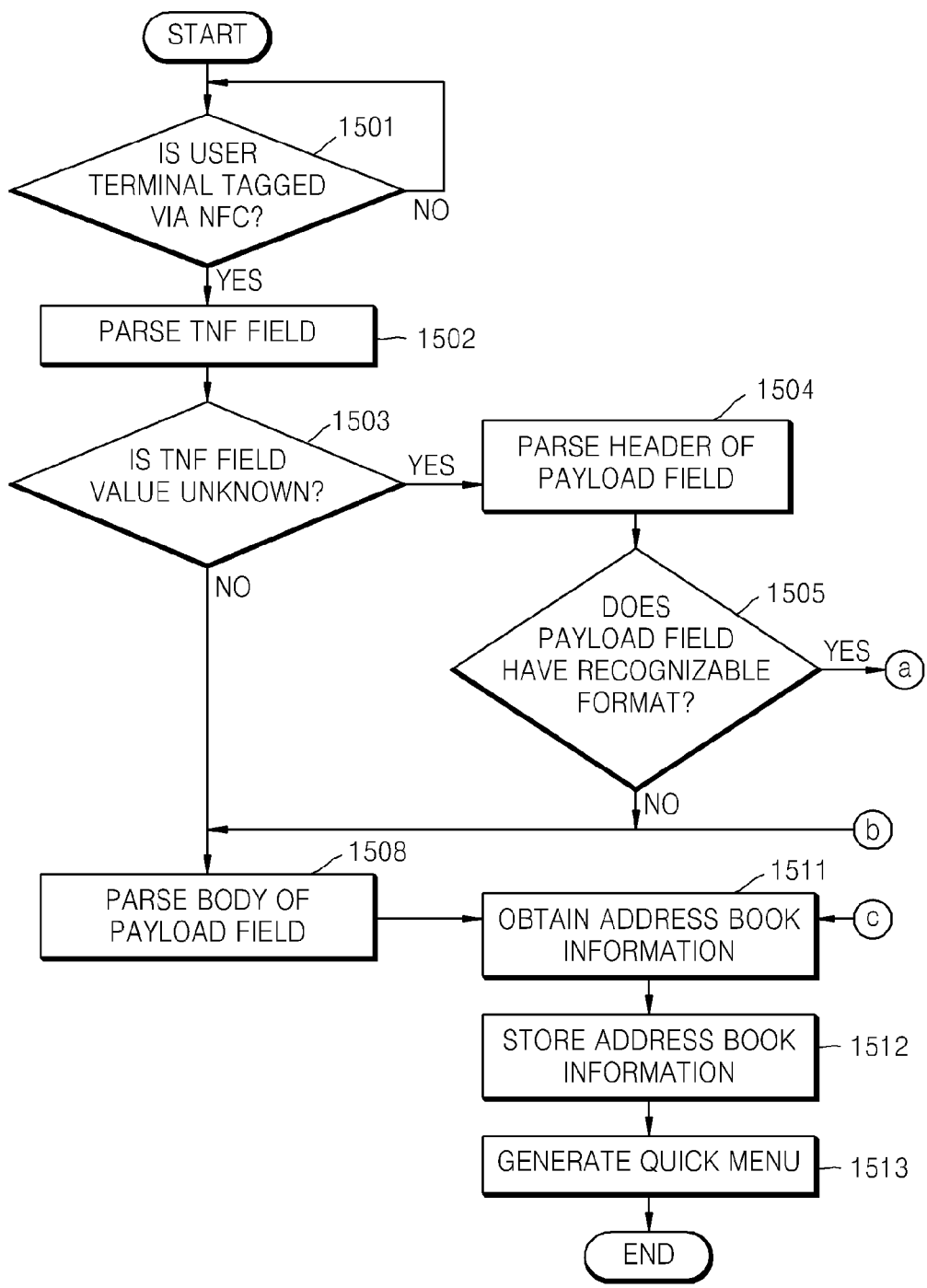
FIGS. 15A and 15B are a combined illustration of operations of analyzing address information received from a user terminal, according to an embodiment of the present inventive concept.
Figure 15B:
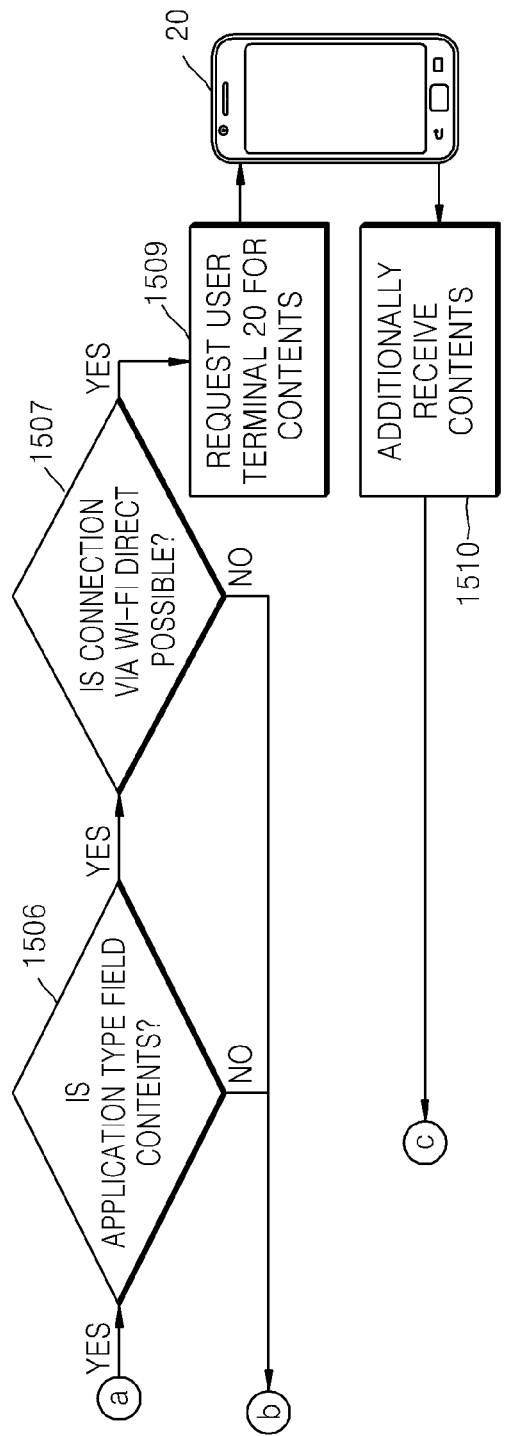

FIGS. 15A and 15B are a combined flowchart illustrating operations of analyzing address information received from the user terminal 20, according to an embodiment of the present inventive concept.

In operation 1501, the NFC module 620 determines whether the user terminal 20 is tagged via a NFC protocol. When the user terminal 20 is tagged, the NFC module 620 receives an NDEF message and address book information included in the NDEF message from the user terminal 20.

In operation 1502, the address analyzing unit 6101 parses a TNF field of the received NDEF message.

In operation 1503, the address analyzing unit 6101 determines whether a result of parsing of the TNF field, that is, a TNF field value denotes unknown (e.g., 0x05).

In operation 1504, the address analyzing unit 6101 parses a header of a PAYLOAD field when the TNF field value denotes unknown.

In operation 1505, after the parsing of the header of the PAYLOAD field, the address analyzing unit 6101 determines whether a PAYLOAD field of an NDEF message is a recognizable format.

In operation 1506, if the PAYLOAD field is a recognizable format, the address analyzing unit 6101 determines whether an Application Type field of the PAYLOAD field is Contents or not.

In operation 1507, if the Application Type field is Contents, the address analyzing unit 6101 determines whether the user terminal 20 and the wireless communication module 650 may be connected by, for example, Wi-Fi.

In operation 1508, as a result of the determining of operations 1503, 1505, 1506, and 1507, if the described conditions are not met, the address analyzing unit 6101 parses a body of the PAYLOAD field.

In operation 1509, the address analyzing unit 6101 requests the user terminal 20 to transmit Contents via the wireless communication module 650.

In operation 1510, the wireless communication module 650 additionally receives Contents from the user terminal 20.

In operation 1511, the address analyzing unit 6101 obtains address book information from a result of parsing the body of the PAYLOAD field or from Contents that are additionally received from the user terminal 20. Also, the address analyzing unit 6101 classifies addresses of the obtained address book information according to address types.

In operation 1512, the address storing unit 640 stores the classified address book information.

In operation 1513, the quick menu generating unit 6103 generates a quick menu based on the classified address book information.

Figure 16:
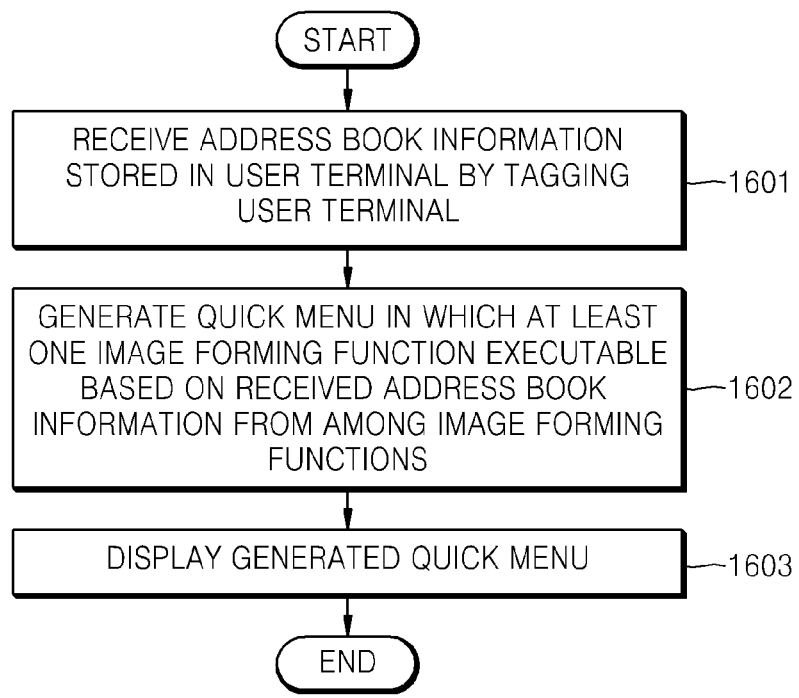
FIG. 16 is a flowchart illustrating a method of displaying a quick menu in an image forming apparatus, according to an embodiment of the present inventive concept.

FIG. 16 is a flowchart illustrating a method of displaying a quick menu in the image forming apparatus 60, according to an embodiment of the present inventive concept. Referring to FIG. 16, the method of displaying a quick menu corresponds to operations that are performed in a time series manner in the image forming apparatus 60 described above with reference to FIG. 6, and thus, description omitted herein but provided above with reference to FIG. 6 may also be applied to the method of displaying a quick menu of FIG. 16.

In operation 1601, the NFC module 620 receives address book information stored in the user terminal 20 by tagging the user terminal 20.

In operation 1602, the control unit 610 generates a quick menu in which at least one image forming function that is executable based on the received address book information from among image forming functions supported by the image forming apparatus 60 is listed.

In operation 1603, the user interface unit 630 displays the generated quick menu.

According to the embodiments of the present inventive concept, when information that a user needs, such as an e-mail address or a fax number, is stored in a user terminal, a quick menu based on address book information stored in the user terminal may be provided to the user simply by near field communication (NFC) tagging between an image forming apparatus and the user terminal. Accordingly, any inconveniences that the user would normally experience to individually search for address information in the user terminal and a menu related to image forming functions in the image forming apparatus may be eliminated.

The embodiments of the present inventive concept can be written as computer programs and can be implemented in general-use digital computers that execute the programs using a computer-readable recording medium. Also, data structures used in the embodiments of the present inventive concept may be written to the computer-readable recording medium using various means. Examples of the computer-readable recording medium include magnetic storage media (e.g., ROM, floppy disks, hard disks, etc.), optical recording media (e.g., CD-ROMs, or DVDs), and storage media (e.g., transmission through the Internet).

While the present general inventive concept has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the inventive concept is defined not by the detailed description herein but by the appended claims, and all differences within the scope will be construed as being included in the present inventive concept.

What is claimed is:

1. An image forming apparatus configured to support a near field communication (NFC) function, the image forming apparatus comprising:
    an NFC module to receive address book information stored in a user terminal by tagging the user terminal having the NFC function;
    a control unit to determine, based on the received address book information, at least one image forming function from among image forming functions supported by the image forming apparatus that is executable, and to generate a quick menu in which at the least one image forming function is listed; and
    a user interface unit to display the generated quick menu.

2. The image forming apparatus of claim 1, wherein the control unit generates the quick menu to display a list of the executable image forming functions based on types of addresses included in the received address book information.

3. The image forming apparatus of claim 1, wherein the control unit comprises:
    an address analyzing unit to analyze types of addresses included in the received address book information;
    a list determining unit to determine a list of image forming functions to be included in the quick menu by mapping each of executable image forming functions according to the analyzed types; and
    a quick menu generating unit to generate the quick menu based on the determined list of the image forming functions.

4. The image forming apparatus of claim 1, wherein the control unit includes an address analyzing unit to analyze an NFC data exchange format (NDEF) message that is received from the user terminal via the NFC module, and
    wherein the control unit generates the quick menu based on the address book information included in a payload body of the analyzed NDEF message.

5. The image forming apparatus of claim 4, wherein the address analyzing unit determines whether to additionally receive address book information stored in the user terminal by using another wireless communication module included in the image forming apparatus based on a Type Name Format (TNF) field value of the analyzed NDEF message, and
    the control unit generates the quick menu based on the additionally received address book information when it is determined to additionally receive the address book information stored in the user terminal by using the other wireless communication module.

6. The image forming apparatus of claim 5, wherein the address analyzing unit uses the other wireless communication module when the TNF field value denotes unknown.

7. The image forming apparatus of claim 1, further comprising:
    an address storing unit to classify addresses included in the received address book information and to store the addresses.

8. The image forming apparatus of claim 1, wherein when at least one image forming function is selected by the user on the displayed quick menu, the user interface unit sets a specific option by using the address book information that is mapped on the selected image forming function.

9. The image forming apparatus of claim 8, wherein when a plurality of image forming functions are selected on the displayed quick menu, the control unit performs the image forming functions according to a WorkFlow function.

10. The image forming apparatus of claim 1, wherein the user interface unit displays the generated quick menu as a popup window.

11. The image forming apparatus of claim 1, wherein the address book information comprises at least one of a fax number, an email address, a telephone number, a server address, and a universal resource locator (URL) address, and
    wherein image forming functions supported by the image forming apparatus comprise at least one of printing, scanning, photocopying, faxing, scan to email, scan to server, scan to URL, scan to PC, scan to shared folder, and a WorkFlow function.

12. A method of displaying a menu in an image forming apparatus supporting a near field communication (NFC) function, the method comprising:
    receiving address book information stored in a user terminal by tagging the user terminal having the NFC function;
    determining, based on the received address book information, at least one image forming function from among image forming functions supported by the image forming apparatus that is executable;
    generating a quick menu in which the at least one image forming function is listed; and
    displaying the generated quick menu.

13. The method of claim 12, wherein in the generating a quick menu, a list of the executable image forming functions is displayed based on types of addresses included in the received address book information.

14. The method of claim 12, wherein the generating of a quick menu comprises:
    analyzing types of addresses included in the received address book information;
    determining a list of image forming functions to be included in the quick menu by mapping the executable image forming functions according to the analyzed types; and
    generating the quick menu based on the determined list of image forming functions.

15. The method of claim 12, wherein the generating of a quick menu comprises:
    analyzing an NFC Data Exchange Format (NDEF) format received from the user terminal via the NFC module; and
    generating the quick menu based on the address book information included in a payload body of the analyzed NDEF message.

16. The method of claim 15, wherein the generating of a quick menu comprises:
    determining whether to additionally receive address book information stored in the user terminal by using another wireless communication module included in the image forming apparatus based on a Type Name Format (TNF) field value of the analyzed NDEF message; and generating the quick menu based on the additionally received address book information.

17. The method of claim 16, wherein in the determining, when the TNF field value denotes unknown, the other wireless communication is used.

18. The method of claim 12, further comprising:
classifying addresses included in the received address book information and storing the classified addresses.

19. The method of claim 12, further comprising:
when at least one image forming function is selected by a user on the displayed quick menu, a specific option is set by using address information mapped on the selected image forming function.

20. A non-transitory computer-readable recording medium having embodied thereon a program for executing the method of claim 12.

* * * * *